April 8, 1924.  
H. P. KRAFT  
SHEET METAL NUT  
Original Filed April 20, 1921  
1,489,325

Inventor:  
Henry P. Kraft,  
By his Attorneys.

Patented Apr. 8, 1924.

1,489,325

UNITED STATES PATENT OFFICE.

HENRY P. KRAFT, OF RIDGEWOOD, NEW JERSEY.

SHEET-METAL NUT.

Application filed April 20, 1921, Serial No. 463,011. Renewed June 1, 1923.

*To all whom it may concern:*

Be it known that I, HENRY P. KRAFT, a citizen of the United States of America, residing in Ridgewood, in the county of Bergen and State of New Jersey, have invented certain new and useful Improvements in Sheet-Metal Nuts, of which the following is a specification.

This invention relates to sheet metal nuts and aims to provide certain improvements therein.

The invention is particularly directed to a sheet metal nut which is especially adapted to be used as a rim nut for tire valves, and which comprises means for securing it to the tire valve casing and means for engaging and holding a dust cap over said valve casing.

According to the present invention I provide a sheet metal nut construction comprising two sheet metal elements or parts, one of which has an extension upon which is formed an outer screw-thread and the other of which has an extension within which is formed an inner screw-thread. These two elements are preferably made of polygonal form and so designed that one is adapted to seat within the other to provide a non-rotative connection between said parts.

The invention also includes other features of construction which will be hereinafter more fully described.

Referring to the drawings, which illustrate one embodiment of the invention:

Figure 1:
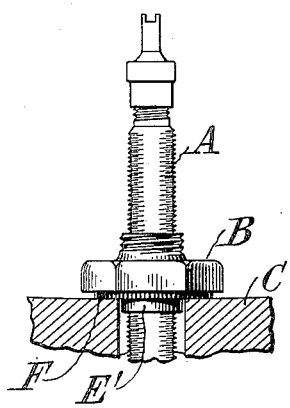
Figure 1 is an elevation of a tire valve casing with the nut of the present invention applied thereon.
Figure 2:
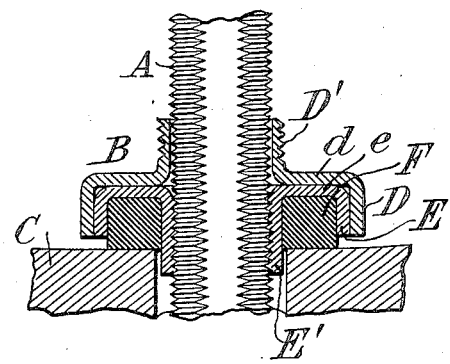
Fig. 2 is a longitudinal section of the nut applied over a tire valve casing, the casing being shown in elevation.
Figure 3:
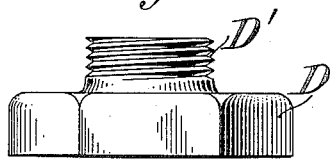
Fig. 3 is an elevation of the outer nut section.
Figure 5:
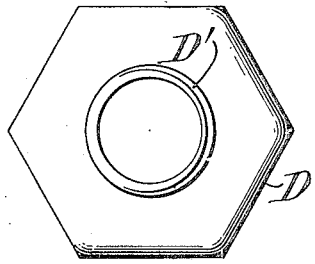
Fig. 5 is a top plan view of Fig. 3.
Figure 4:
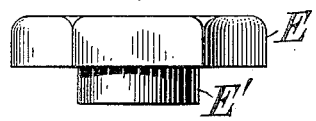
Fig. 4 is an elevation of the inner nut section.
Figure 6:
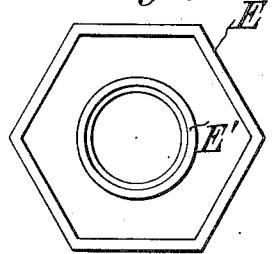
Fig. 6 is a bottom plan view of Fig. 4.

Referring to the drawings, let A indicate a tire valve casing of the usual construction which is provided on its exterior with mutilated screw-threads, over which the nut of the present invention, indicated as a whole by the letter B, is screw-threaded, and shown as engaging the usual felly or rim C.

In the preferred construction of the nut, two sheet metal blanks are used, one being formed with exterior flat faces D, an intermediate flat section $d$ and an exteriorly screw-threaded extension D' and the other with similarly formed exterior faces E, an intermediate flat section $e$, and an interiorly screw-threaded cylindrical extension E' extending in the same general direction as the flat faces E. These flat faces D and E on the nut sections constitute polygonal flange or skirt portions which in the assembling of the nut sections are placed one within the other, with the intermediate flat sections $d$ and $e$ abutting and secured together in any desired manner, as by upsetting the edge of the outer one over the edge of the inner, by prick punching one or more of the outer flat faces when in assembled position or in any other suitable way. The exteriorly screw-threaded extension D' serves as a means of attachment for the usual dust cap (not shown) while the interiorly screw-threaded cylindrical extension E' serves as a means of attachment for the nut on the valve casing. This extension E' together with the flanged flat faces E serves as a washer seat for a packing washer F. The extension E' is preferably made to extend inwardly a greater distance than the flat faces E or washer F and thus acts as a centering and reinforcing means for the valve casing where the felly opening accommodating the valve casing is of larger diameter than the casing. The extension D' has an inner diameter just large enough to pass over the valve casing and cooperates with the extension E', in reinforcing the valve stem and insuring it against severe shearing strains. The screw-thread formed on the extension D' is obviously of larger diameter than the thread on the exterior of valve casing and thus permits the use of a valve cap on the valve casing which is of greater external diameter than the diameter of the casing itself. This construction facilitates the use of a valve having no reduced nipple at its end; in such constructions, the valve cap if it fits exteriorly of the valve, must of necessity be of larger diameter than the valve casing and hence prevents the use of a dust cap which screws directly upon the casing.

While I have shown and described one form of the invention, it will be understood that I do not wish to be limited thereto, since various changes may be made therein without departing from the spirit of the invention.

What I claim is:—

1. A nut formed of two interfitting sheet metal parts each provided with a continuous imperforate flange forming a recess, and the two being connected together one within the other with their recesses facing in the same direction.

2. A nut formed of two interfitting sheet metal parts each provided with a continuous imperforate flange forming a recess, and the two being connected together one within the other with their recesses facing in the same direction, and one of said parts having an exteriorly screw-threaded extension.

3. A nut formed of two interfitting sheet metal parts each provided with a continuous imperforate flange forming a recess, and the two being connected together one within the other with their recesses facing in the same direction, and one of said parts having an interiorly screw-threaded extension.

4. A nut formed of two interfitting sheet metal parts each provided with a continuous imperforate flange forming a recess, and the two being connected together one within the other with their recesses facing in the same direction, one of said parts having an exteriorly threaded extension and the other of said parts having an interiorly threaded extension.

5. A nut formed of two interfitting sheet metal parts each provided with a flange forming a recess, and the two being connected together one within the other with their recesses facing in the same direction, one of said parts having an exteriorly threaded extension and the other of said parts having an interiorly threaded extension, and said extensions extending in opposite directions.

6. A nut formed of two polygonally interfitting sheet metal parts, each provided with a continuous imperforate flange forming a recess, and the two being connected together one within the other with their recesses facing in the same direction, and one of said parts having an outwardly projecting exteriorly screw-threaded extension.

7. A nut formed of two polygonally interfitting sheet metal parts, each provided with a flange forming a recess, and the two being connected together one within the other with their recesses facing in the same direction, and one of said parts having an inwardly projecting interiorly screw-threaded extension.

8. A nut formed of two polygonally interfitting sheet metal parts, each provided with a flange forming a recess, and the two being connected together one within the other with their recesses facing in the same direction, one of said parts having an outwardly projecting exteriorly screw-threaded extension and the other of said parts having an inwardly projecting interiorly screw-threaded extension.

9. A nut formed of two polygonally interfitting sheet metal parts, each provided with a flange forming a recess, and the two being connected together one within the other with their recesses facing in the same direction, one of said parts having an outwardly projecting exteriorly screw-threaded extension and the other of said parts having an inwardly projecting interiorly screw-threaded extension, and said extensions being approximately of the same internal diameter.

10. A sheet metal structure formed of two sheet metal parts each provided with a flange forming a recess, an extension, and a substantially flat portion between said flange and extension, and the two parts being connected together, one within the other, with their flat portions abutting.

11. A sheet metal structure formed of two polygonally interfitting sheet metal parts each provided with a flange forming a recess, an extension, and a substantially flat portion between said flange and extension, and the two parts being connected together, one within the other, with their flat portions abutting.

12. A sheet metal structure formed of two sheet metal parts each provided with a flange forming a recess, an extension, and a substantially flat portion between said flange and extension, and the two parts being connected together, one within the other, with their flat portions abutting, the extensions on said parts projecting in opposite directions.

13. A nut formed of two interfitting sheet metal parts each provided with a continuous imperforate flange forming a recess, and the two being connected together one within the other with their recesses facing in the same direction and a packing washer in the recess on the inner of said parts.

14. A nut formed of two interfitting sheet metal parts, each comprising an intermediate portion, an exterior flange and an interior extension, the extensions extending in opposite directions, the flange and extension on one of said parts extending in the same direction and said extension being of greater height than said flange.

15. A nut formed of two interfitting sheet metal parts, each comprising an intermediate portion, an exterior flange and an interior extension, one of said parts being of channel form with its lateral sides of unequal height, and a packing washer in said channel projecting beyond the edge of the lower side but not out to the edge of the higher side.

16. A nut formed of two interfitting sheet metal parts, each comprising an intermediate portion, an exterior flange and an interior extension, one of said extensions being internally screw-threaded to engage over a tire valve casing, a packing washer surrounding said extension, except at its free end, and the free end of said extension being adapted to enter in the opening of a wheel felly through which the tire valve casing extends, when the nut is applied over said casing and the packing washer of the nut engages the face of the felly.

17. A sheet metal nut comprising a member having a pair of flanges forming a channel, having its outer flange or wall shorter than its inner flange and a packing washer within said channel.

In witness whereof, I have hereunto signed my name.

HENRY P. KRAFT.